US012583763B2

(12) United States Patent
Razin et al.

(10) Patent No.: US 12,583,763 B2
(45) Date of Patent: Mar. 24, 2026

(54) METHOD, SYSTEM AND DEVICE FOR LIQUID TREATMENT

(71) Applicant: BRITA SE, Taunusstein (DE)

(72) Inventors: Denis Razin, Wiesbaden (DE);
Benjamin Richstein, Taunusstein (DE);
Jochen Zöller, Nastätten (DE)

(73) Assignee: BRITA SE, Taunusstein (DE)

( * ) Notice: Subject to any disclaimer, the term of this patent is extended or adjusted under 35 U.S.C. 154(b) by 1078 days.

(21) Appl. No.: 17/608,294

(22) PCT Filed: May 27, 2020

(86) PCT No.: PCT/EP2020/064703
§ 371 (c)(1),
(2) Date: Nov. 2, 2021

(87) PCT Pub. No.: WO2020/239836
PCT Pub. Date: Dec. 3, 2020

(65) Prior Publication Data
US 2022/0250939 A1 Aug. 11, 2022

(30) Foreign Application Priority Data
May 28, 2019 (EP) ..................................... 19177007

(51) Int. Cl.
*C02F 1/00* (2023.01)
*C02F 1/28* (2023.01)
(Continued)

(52) U.S. Cl.
CPC .............. *C02F 1/008* (2013.01); *C02F 1/001* (2013.01); *H04L 9/088* (2013.01); *H04L 9/3247* (2013.01);
(Continued)

(58) Field of Classification Search
CPC .......... C02F 1/008; C02F 1/001; C02F 1/283; C02F 1/42; C02F 2209/006; H04L 9/088;
(Continued)

(56) References Cited

U.S. PATENT DOCUMENTS 6,024,867 A 2/2000 Parise
6,936,160 B2 8/2005 Moscaritolo et al.
(Continued)

FOREIGN PATENT DOCUMENTS

CN 104620105 A 5/2015
CN 109477660 A 3/2019
(Continued)

OTHER PUBLICATIONS

"EDID Unraveled" AV Technology (Year: 2014).*
(Continued)

*Primary Examiner* — Terry K Cecil
(74) *Attorney, Agent, or Firm* — Hudak, Shunk & Farine Co. LPA

(57) ABSTRACT

A device, a system and a method for liquid treatment. The liquid treatment device includes a processing unit, a memory unit and a plug-in module interface for coupling to plug-in modules,
the memory unit and the plug-in module interface are communicatively connected to the processing unit, and the method includes:
determining a parameter characterizing the liquid treatment process and sending the parameter to the processing unit;
receiving the parameter by the processing unit;
identifying a plug-in module coupled to the plug-in module interface by the processing unit;
in response to identifying the plug-in module loading instructions from the memory unit to the processing unit; and
(Continued)

sending the parameter according to the instructions via the plug-in module interface to the plug-in module by the processing unit.

26 Claims, 5 Drawing Sheets

(51) Int. Cl.
| | | |
|---|---|---|
| *C02F 1/42* | (2023.01) | |
| *H04L 9/08* | (2006.01) | |
| *H04L 9/32* | (2006.01) | |

(52) U.S. Cl.
CPC ................ *C02F 1/283* (2013.01); *C02F 1/42* (2013.01); *C02F 2209/006* (2013.01)

(58) Field of Classification Search
CPC .... H04L 9/3247; H04W 12/03; G06F 9/4413; G06F 9/44526; G06F 21/44
See application file for complete search history.

(56) References Cited

U.S. PATENT DOCUMENTS

| | | | |
|---|---|---|---|
| 2004/0079685 A1 | 4/2004 | Moscaritolo et al. | |
| 2016/0340202 A1 | 11/2016 | Lautzenheiser et al. | |
| 2019/0170392 A1 | 6/2019 | Powell et al. | |

FOREIGN PATENT DOCUMENTS

| | | | |
|---|---|---|---|
| RU | 85010 U1 | 7/2009 | |
| RU | 2369980 C2 | 10/2009 | |
| RU | 2444779 C2 | 3/2012 | |
| WO | 2014033145 A1 | 3/2014 | |
| WO | WO-2020167453 A1 * | 8/2020 | |

OTHER PUBLICATIONS

Bagyaveereswaran, Automation and On-Line Monitoring of Effluent Treatment Plant, Int J. Chem. Sci., 2016, pp. 3167-3178, vol. 14, Issue 4, Sadguru Publications, India, ISSN 0972-768X.

Anonymous, Digichem® Plus+Commercial Dosing Control System, Nov. 2016, pp. 1-8, URL:https://www.waterco.com.my/waterco/brochures/pool-spa/commercial-chemical-doser/joseph-zzbl1595-digichem-plus-single-pages-1.pdf.

Anonymous, Water Treatment Controllers, Oct. 2013, 6 pages, URL: https://www.h2tronics.com/wp-content/uploads/sites/3/2016/07/Walchem_Controller_Brochure.pdf., Walker America, Holliston, MA.

Communication pursuant to Article 94(3) EPC dated Jun. 6, 2023 for corresponding European Application 20 727 334.3.

Anonymous, transPAC Case Study Glascoed Water Treatment Works ejector solutions Welsh Water-Glascoed Water Treatment, Apr. 30, 2015, 4 pages URL:https://www.transvac.co.uk/pdf/Case%20Study%20-%20Welsh%20Water%20-%20Glascoed.pdf.

Bagyaveereswaran et al., Automation and on-line Monitoring of Effluent Treatment Plant, Int. J. Che. Sci., 2016, pp. 3167-3178, vol. 14, Sadguru Publications, India.

* cited by examiner

METHOD, SYSTEM AND DEVICE FOR LIQUID TREATMENT

FIELD OF THE INVENTION

The invention relates to a method of operating a liquid treatment device. The invention also relates to a system for liquid treatment, a liquid treatment device and a plug-in module.

BACKGROUND OF THE INVENTION

There are liquid treatment devices for many applications, in particular for performing a liquid treatment process. Liquid treatment devices may for example be used for purifying, sterilization, deferrization, demanganization, decalcifying, demineralization, dosing a liquid with any substance, adjusting the pH-value, adjusting the conductivity or simply for mixing two or more liquids together. The efficiency of the treatment process may be enhanced by monitoring and readjusting the liquid treatment devices regularly.

WO 2014/033145 discloses a liquid treatment device having an interface and a method for operating said system. The interface is used for receiving user input and/or providing output for the user and for exchanging data with an external device. The interface is an integral part of the liquid treatment device, which is not removable without destroying the liquid treatment device.

Liquid treatment devices may be configured according to the user's desires. A user having a liquid treatment system without any interface at all may want to upgrade that system, so his liquid treatment device gains the ability to communicate to other systems. Another user having a liquid treatment device including an interface for communication might consider downgrading the system, because the operating costs are too high and the advantages of the interface are not used anyway.

SUMMARY OF THE INVENTION

Therefore, the problem to be solved by the invention is to provide a method, a system for water treatment, a liquid treatment device and a plug-in module, which are flexible and may be reconfigured according to the requirements of the user without buying a completely new liquid treatment device.

The problem is solved by the subject matter of each of the independent claims.

The following description relates to "system" and "liquid treatment device". Within the framework of this invention, "liquid treatment device" refers to a system for the treatment of liquids excluding any additional modules like plug-in modules or external components such as terminals, personal computers, servers etc. When it is referred to "liquid treatment device", it is always indicated as such. On the other hand, "system" means a plurality of parts interacting with each other and working together to perform a specific task, which may include additional modules like plug-in modules and/or external components such as terminals, personal computers, servers etc.

In a first aspect, the invention relates to a method for operating a liquid treatment device. The liquid treatment device comprises a processing unit, a memory unit and a plug-in module interface for coupling to plug-in modules.

The memory unit and the plug-in module interface are communicatively connected to the processing unit. The method comprises:

determining a parameter characterizing the liquid treatment process and sending the parameter to the processing unit;

receiving the parameter by the processing unit;

identifying a plug-in module coupled to the plug-in module interface by the processing unit;

in response to identifying the plug-in module loading instructions from the memory unit to the processing unit; and sending the parameter according to the instructions via the plug-in module interface to the plug-in module by the processing unit.

According to another aspect the invention relates to a system for liquid treatment, the system comprising a liquid treatment device and a plug-in module, wherein the liquid treatment device comprises a liquid treatment container containing at least one liquid treatment medium and a device head adapted for coupling to the liquid treatment container and wherein the plug-in module is configured to be plugged into the device head of the liquid treatment device, the device head comprising:

a processing unit;

a memory unit communicatively connected to the processing unit;

means for determining a parameter characterizing the liquid treatment process;

a plug-in module interface for communicatively coupling the plug-in module to the processing unit;

means for identifying the plug-in module;

means for loading instructions from the memory unit in response to identifying the plug-in module;

means for sending the parameter according to the instructions via the plug-in module interface (36) to the plug-in module;

means for mechanically coupling the liquid treatment device to the plug-in module;

wherein the plug-in module comprises:

a liquid treatment device interface for communicatively coupling the plug-in module to the liquid treatment device;

means for identifying the plug-in module to the liquid treatment device;

means for receiving a parameter characterizing the liquid treatment process from the liquid treatment device;

means for functional processing of the parameter;

means for mechanically coupling the plug-in module to the liquid treatment device.

In yet another aspect, the invention relates to a liquid treatment device. The system comprises a liquid treatment container containing at least one liquid treatment medium, a processing unit, a memory unit communicatively connected to the processing unit and means for determining a parameter characterizing the liquid treatment process. The liquid treatment device further comprises a plug-in module interface for plug-in modules coupled to the processing unit, means for identifying a plug-in module, means for loading instructions from the memory unit in response to identifying the plug-in module and means for sending the parameter according to the instructions via the plug-in module interface to the plug-in module.

The liquid treatment medium may for example be a filter medium like active coal or a reactor medium like an ion exchange medium.

The processing unit may for example be a single or multicore microprocessor, a field programmable gate array, a microcontroller or any other device capable of executing a program code. The memory unit may preferably be a non-volatile memory unit.

The means for determining the parameter, the means for identifying a plug-in module, the means for loading instructions from the memory unit and the means for sending the parameter may for example be integrated circuits within the processing unit or in form of software, which is stored on the memory unit and executed by the processing unit.

By having the plug-in module interface, the liquid treatment device is able to receive a plug-in module, which is coupled to the plug-in module interface by a corresponding liquid treatment device interface. Thus, the liquid treatment device can be enhanced r modified by any plug-in module or its functions respectively.

Preferably, the liquid treatment device further comprises a device head adapted for coupling to the liquid treatment container (12), the device head comprising the processing unit (32); the memory unit (34) communicatively connected to the processing unit (32); the means for determining a parameter characterizing the liquid treatment process; the plug-in module interface (36) for communicatively coupling a plug-in module (40) to the processing unit (32); the means for identifying a plug-in module (40); the means for loading instructions from the memory unit (34) in response to identifying a plug-in module (40); the means for sending the parameter according to the instructions via the plug-in module interface (36) to a plug-in module (40); and means for mechanically coupling the liquid treatment device (10) to a plug-in module (40).

Thus the liquid treatment device preferably comprises two parts: the liquid treatment container and the device head, depending on the application also called filter head. The liquid treatment container comprises the liquid treatment medium. The device head comprises the above mentioned functional or electronic components of the liquid treatment device including one or more sensors being part of the means for determining the parameters.

The liquid treatment container is preferably exchangeably connected to the device head. If the liquid treatment medium is depleted, i.e. the liquid is not treated anymore, the liquid treatment container may be removed from the device head and a new liquid treatment container with replenished, reactivated or refilled liquid treatment medium can be connected to the device head. Thus, the device head is a part, which can be used continuously whilst the liquid treatment container can be exchanged if needed.

The liquid treatment device may further comprise for example an inlet, an outlet, one or more valves, a valve motor for controlling valves to adjust the amount of liquid being treated r the ratio of the portion of liquid being treated to the portion of liquid not being treated.

Preferably, the liquid treated by the liquid treatment device is table water. The liquid treatment device used for executing the method according to the invention may therefore be a water filter system, a water reactor system, or any system suitable to treat water.

The liquid treatment device is capable of obtaining data. The data is provided in form of a parameter characterizing the liquid treatment process. Within the framework of this invention, "a parameter" and "the parameter" may mean "a single parameter", "at least one parameter" or "a plurality of parameters".

The parameter is determined by the means for determining a parameter characterizing the liquid treatment process.

Preferably, the means for determining said parameter comprise instructions for determining the parameter from values measured by the sensor for determining the parameter.

The parameter for characterizing the liquid treatment process may for example be the temperature of the untreated and/or the treated water, the conductivity of the untreated and/or the treated water, the water hardness of the untreated water, the water hardness of the treated water, the difference of the water hardness of the treated and untreated water, a ratio of the liquid being treated to the liquid being not treated (water bypassing the liquid treatment container), a value characterizing the purity of the treated liquid, the amount (volume or mass) of the treated liquid since the liquid treatment device was maintained or the time the liquid treatment device is operated. Thus, the parameter may represent a measured value determined by a sensor, an input value for or a return value from any component of the liquid treatment device.

The determined parameter is sent to the processing unit of the liquid treatment device by the determining component, for example the sensor. The parameter is sent to the processing unit regularly or upon the processing unit having sent a request for sending the parameter.

The step of determining the parameter may be performed at any time before sending the parameter. In an embodiment, the parameter is determined after the plug-in module is identified or after the instructions are loaded. To determine the parameter after the instructions being loaded has the advantage of being able to determine the parameter for the plug-in module and thus to react on the type of the plug-in module.

To interact with plug-in modules the liquid treatment device, especially the device head, comprises a plug-in module interface. Preferably, the device head comprises a single plug-in module interface for communicatively coupling the plug-in module independently of its functionality.

Any plug-in module for interacting with the liquid treatment device may be coupled to, for example inserted into or wired to, the plug-in module interface. To do so, the plug-in module comprises a liquid treatment device interface matching the requirements for connecting to the plug-in module interface of the liquid treatment device. Such requirements may for example include the same number of connection pins, an identical interface standard, the same programming language or protocol specification, means for providing a sufficient power supply, etc.

Furthermore, the plug-in module interface is preferably configured to enable a communication with different types of plug-in modules. Within the framework of this invention the types of plug-in modules are distinguished by using different communication standards r having different functionalities. For example, one type of plug-in modules may provide a display function. Another type of plug-in modules may provide a memory function. Yet another type of plug-in modules may provide a communication function. And yet other types of plug-in modules may provide a combination of at least two of these or any other functions.

The liquid treatment device may work autonomously without the plug-in module being coupled to the liquid treatment device. Then of course, the features of the plug-in module are not available for the liquid treatment device. Nevertheless, the treatment process may be continued without the plug-in module as long as the liquid treatment medium is able to treat the liquid.

In one embodiment, the connection of the plug-in module to the liquid treatment device may be established whilst the liquid treatment device is operated or only if the liquid treatment device is shut down.

After being coupled to the liquid treatment device the plug-in module is identified by the processing unit using the means for identifying the plug-in module. The identification includes the determination of the type of the plug-in module, its function and if available its identification number and its function. In other words, identifying the plug-in module means that the type of the plug-in module is recognized as a type of plug-in modules which is compatible with the device head.

If the plug-in module is identified, the processing unit loads instructions from the memory unit using the means for loading instructions from the memory unit. The instructions are instructions for the processing unit to handle the parameter according to the connected plug-in module. For example, a first plug-in module may require the processing unit to execute first instructions, while a second plug-in module may require the processing unit to execute second instructions. Thus, the loaded instruction may depend on the type of the coupled plug-in module.

The memory unit may provide instructions for one or more type of plug-in modules including different communication standards for different types of plug-in modules. For example, display plug-in modules and memory plug-in modules may use different communication standards. By providing several communication standards stored in the memory unit, the liquid treatment device may be operated with a number of different types of plug-in modules.

After the instructions are loaded to the processing unit, the parameter characterizing the liquid treatment process may be sent to the plug-in module for further processing, which depends on the plug-in modules' functions. The parameter is sent by using the means for sending the parameter according to the instructions via the plug-in module interface, which may comprise a protocol for sending the parameter as a data package or a data stream to the plug-in module depending on the function of the plug-in module.

Both the device head and the plug-in module comprise means for mechanically coupling the liquid treatment device to the plug-in module or vice versa. Although, it is possible to integrate the means for mechanically coupling into the mechanical parts of the interfaces, dedicated means for mechanically coupling are preferred due to a higher stability and robustness. For example, common USB flash drives do not comprise any means for mechanical coupling the drive to the host computer but the USB plug itself, which may be not as strong as if the drive was screwed or fixed otherwise to the computer. Thus, dedicated means for mechanical coupling strengthen the coupling between the plug-in module and the liquid treatment device.

The means for mechanical coupling of both the device head and the plug-in module are preferably means for releasably coupling.

By outsourcing functions to the plug-in module, the liquid treatment device may be upgraded or downgraded as desired by the user any time by just adding, exchanging or removing the plug-in module. It is not necessary to exchange the entire liquid treatment device or the device head in order to enhance or change the functions. Therefore, the aforementioned problem is solved by outsourcing the optional functions to a plug-in module or many plug-in modules, which may be coupled to the liquid treatment device.

In one embodiment, the step of identifying the plug-in module comprises the steps of:

i. sending an identification request to the plug-in module via the plug-in module interface; and ii. receiving a response to the identification request from the plug-in module.

Accordingly, the means for identifying the plug-in module (40) comprise: means for sending an identification request to the plug-in module (40) via the plug-in module interface (36); and means for receiving a response to the identification request from the plug-in module (40) via the plug-in module interface (36).

The liquid treatment device may detect a plug-in module at the plug-in module interface by applying a test current to the plug-in module interface. Alternatively, the liquid treatment device may detect a plug-in module at the plug-in module interface by repeatedly sending an identification request. In a third variant, the plug-in module may be coupled to the liquid treatment device when the liquid treatment device is shut down. Upon starting up the liquid treatment device, it tries to detect a plug-in module at the plug-in module interface. If there is no plug-in module, the liquid treatment device starts operating as usual. If the liquid treatment device detects a plug-in module at the plug-in module interface, it may send the request for identification to the plug-in module and, if the identification is successful, start using the plug-in modules functions.

The plug-in module is coupled to the liquid treatment device by using its liquid treatment device interface. In other words, the liquid treatment device interlace of the plug-in module and the plug-in module interface of the liquid treatment device are coupled to each other.

The identification request triggers the plug-in module to send a response to the liquid treatment device. The response may comprise an ID-number of the plug-in module, its model-type or other means for identification, which are suitable to determine the identity or the type of the plug-in module. The identification further reveals to the liquid treatment device, which functions the plug-in module may provide to the liquid treatment device. After receiving the plug-in modules response, the processing unit of the liquid treatment device may load instructions according to the received ID-number or the other means for identification from the memory unit.

Without the identification request, the liquid treatment device would only detect a plug-in module being any plug-in module at the plug-in module interface. Then it would have to load universal instructions how to handle the parameter in general. The sending of an identification request and receiving of a response to the identification request enable a more precise selection of the instructions for handling the parameter. The response of the plug-in module may for example provide a correct and exact identification of the plug-in module. Thus, the processing unit may select more specific instructions for handling the parameter according to the model of the coupled plug-in module or its type.

In an embodiment, the plug-in module is a plug-in communication module connectable to at least one external system and the means for functional processing are means for communicating with the external system. The communication with the external system comprises at least sending the parameter from the plug-in module to the external system via wired or wireless communication. The method further comprises sending the parameter from the plug-in module to an external system via wired or wireless communication.

The external system may be any suitable system for receiving and handling data from the liquid treatment device. It may be provided as a personal computer, a server, a cloud computing environment, a smart phone, a telefax, a pager, a smart watch, a diagnosis device for liquid treatment devices, a coffee maker, a steamer or moistener, a dishwasher, a dispensing system for beverages, particularly a water dispenser, a beverage vending machine or any other electronical system.

The communication between the plug-in module and the external system may be performed over an electronic connection via a cable or over an optoelectronic connection, i. e. fiber optic cables. A wired connection provides the advantage of being more secure and harder to be spied upon. Especially a direct-wired communication between the plug-in module and the external system without any further device in between must be physically manipulated for spying the communication.

The communication may alternatively be performed via wireless communication, for example radio communication, near field communication, radio frequency identification, a wireless local area network, optical communication like infrared communication or ultrasonic signals. The communication may comprise in any case a communication over a worldwide network like the internet, an intranet, a (wireless) local area network or a communication from the liquid treatment device via the plug-in module directly to the external device without using any additional network at all.

A wireless communication provides the advantage of being independent from any cable. The liquid treatment device may for example be put to another location without having the trouble of laying cables anew.

In another embodiment, the communication between the liquid treatment device and the external system is encrypted.

An encrypted communication makes the liquid treatment device harder to spy on.

In an embodiment, the liquid treatment device further comprises a liquid treatment container and a sensor, wherein the sensor is communicatively connected to the processing unit, and the parameter characterizing the liquid treatment process is a parameter characterizing a liquid passing the liquid treatment container. The parameter is preferably determined by a sensor for measuring the parameter, like for example a sensor for measuring the water hardness or a flow meter.

Furthermore, it is possible to monitor the input value for a valve motor controlling a mixing valve, which controls the ratio of a portion of liquid, which is treated, to the portion of liquid, which is not treated by the liquid treatment device. However, determining a parameter directly from the treated liquid or from the liquid to be treated may increase the efficiency of the treatment process by having direct feedback.

In yet another embodiment the method comprises the step of receiving an instruction by the liquid treatment device via the plug-in module from the external system or the plug-in module itself. Accordingly, the liquid treatment device is configured to receive an instruction via the plug-in module from the external system or the plug-in module itself and furthermore to process said instruction. The external system or the plug-in module may be input devices, which provide a human-machine interface. For example, the plug-in module may be a plug-in display device having a touch display, a keyboard or buttons for receiving input from a user or any combination thereof. Upon receiving the input, the liquid treatment device may change one or more of its operating values. The operating values may comprise for example, without being limited to, operation status on and off, values for controlling the aforementioned valve motor or an off-set for resetting the time of operation or amount of liquid since the last maintenance back to zero, the target carbonate hardness, which is the nominal value for water hardness after the treatment process, or any treatment medium specific value, such as a filter specific value. For changing the operating values, the processing units comprises means for processing and executing instructions received from the plug-in module or an external system.

With the ability to receive and process input, the method and liquid treatment device may not only read out, but readjust the liquid treatment device according to changed conditions. For example, the mixing valve mentioned above may be adjusted according to the input value coming from a sensor for determining the water hardness after the water treatment process. If the water hardness of the water at the sensor is too high, the valve motor may be controlled to adjust the mixing valve to a more closed position, in which the ratio of treated water to untreated water increases. In opposition, if the water hardness of the water at the sensor is too low, the valve motor may be controlled to adjust the mixing valve to a more open position, in which the ratio of treated water to untreated water decreases.

In an embodiment, the system further comprises a terminal and the means for functional processing of the parameter are means for communicating with the terminal, wherein the terminal comprises:
a terminal processing unit;
a terminal memory unit;
means for communicating with the plug-in module; and
means for receiving the parameter from the plug-in module,
wherein the plug-in module further comprises:
means for executing instructions received from the terminal.

Preferably, the terminal may be configured as web-based computing unit, especially a computing unit which is communicatively coupled to the liquid treatment device via a network, especially the internet. A net-based or web-based connection to the terminal provides the function of the liquid treatment device being able to be accessed remotely. For example, the user may check the status of the liquid treatment medium remotely by accessing the parameter via the terminal. Another advantageous embodiment comprises a terminal providing a cloud service for storing and processing the parameter online.

Furthermore, a system comprising the liquid treatment device and the terminal as an integral part of the system advantageously provides a communication which may be safer than a communication between the liquid treatment device and an external system. Basically, the terminal and any external system may differ by the terminal being known to or registered at the liquid treatment device, e.g. by being authenticated beforehand.

Before the plug-in module and the terminal start communicating, the terminal may need to authenticate itself to the plug-in module and vice versa. Therefore, the plug-in module may comprise means for authenticating to the terminal and the terminal may comprise means for authenticating to the plug-in module. The means for authenticating may comprise a symmetric key or a pair of asymmetric keys each. In the latter case, the means for authenticating of the plug-in module comprise a private key and a public key, wherein the public key is communicated to the terminal. The means for authenticating of the terminal may also comprise a private key and a public key, wherein the public key is communicated to the plug-in module.

After authenticating to each other, the plug-in module may start to provide its function to the terminal. The function provided to the terminal is at least communicating the parameter characterizing the liquid treatment process.

The plug-in module may be operated preferably in one of two ways when communicating the parameter to the terminal. Firstly, the plug-in module may send the parameter to the terminal in an ongoing data stream while updating the actual values of the parameter regularly or continuously.

Secondly, the plug-in module provides the sending of the parameter to the terminal. When providing the sending of the parameter, the liquid treatment device shall not send the parameter to the plug-in module whilst the plug-in module waits for a request from the terminal to send the parameter. As long as there is no such request, the plug-in module and the liquid treatment device will just idle. The terminal may automatically or manually, i.e. upon an input of a user, send a request for sending the parameter from the liquid treatment device via the plug-in module. The request from the terminal is received by the plug-in module and forwarded to the liquid treatment device. The request of the terminal then triggers the instructions loaded from the memory unit of the liquid treatment system and the parameter is sent to the plug-in module. Upon receiving the parameter, the plug-in module will forward the parameter to the terminal, where the parameter is used, analyzed or handled otherwise.

In an embodiment, in which the user gives the terminal input to send the request for sending the parameter, the user may also choose which parameter he wants to be sent, if the liquid treatment device is capable of providing more than one parameter.

In a further embodiment, the terminal is a server, which is configured to communicate with a plurality of liquid treatment devices each coupled to a plug-in communication module. The liquid treatment devices may be water treatment systems, which are placed in a number of households, stores or offices for the treatment of drinking water. All of the liquid treatment devices are registered at the server and connected to the server via their plug-in communication modules. Being "registered at the server" means that the server is able to establish a communication with the liquid treatment device.

The liquid treatment devices may send the parameter to the server regularly either upon a manual or automated request from the server or in predetermined time intervals. The server may save, surveil or analyze the parameter coming from the liquid treatment devices individually or it may provide the parameter to a technician. If a liquid treatment device detects a malfunction or a parameter is out of its determined range, the server may send instructions to reboot or readjust the liquid treatment device or its components respectively. Alternatively, or if the rebooting or the readjusting does not solve the issue, the server may send a message to a technician, who may be sent out for fixing or exchanging the liquid treatment device.

In another embodiment, the plug-in module may receive instructions for displaying the parameter on an on-board display, for saving the parameter to a memory unit of the plug-in module, to send the parameter characterizing the plug-in module itself, like an ID-number, available memory space, time of operation, etc.

In an embodiment, the means for functional processing of the parameter comprise a display for displaying the parameter, a mass memory module comprising a memory for storing the parameter or a combination thereof or a special interface, for example, for user-specific solutions.

For example, the plug-in module comprises a display for displaying the parameter or the parameter and other values to a user of the system. In another example, the plug-in module comprises a memory unit for saving the parameter over time preferably for analysis and optimizing the liquid treatment process later on. In yet another example, the plug-in module may comprise a memory unit and a display for saving the parameter and displaying the saved parameter values to a user via the display.

In an embodiment, the plug-in module comprises multiple means for functional processing. Nevertheless, the plug-in module communicates with the liquid treatment device only via the liquid treatment device interface and the plug-in module interface of the device head.

In an embodiment, the means for mechanically coupling the plug-in module to the liquid treatment device and the means for mechanically coupling the liquid treatment device to the plug-in module are formed as a pair of releasable interlocking means.

The interlocking means form a plug connection, preferably a form-locking connection.

In another embodiment, the means for mechanically coupling the plug-in module to the liquid treatment device and/or the means for mechanically coupling the liquid treatment device to the plug-in module are configured to be brought into a holding state for locking the coupling of the plug-in module and the liquid treatment device and a release state for removing the plug-in module from the liquid treatment device.

Changing the state of the means for mechanically coupling from a holding state to a release state enables the plug-in module to be plugged into and removed from the liquid treatment device easily. Preferably, there is no or only a little force to be applied by a user for changing the state of the means for mechanically coupling from one state to the other.

In an embodiment, the device head further comprises a housing part in which at least the plug-in module interface is arranged, and which includes the means for mechanically coupling the liquid treatment device to the plug-in module.

Preferably, the means for mechanically coupling the liquid treatment device to the plug-in module are integrally formed with the housing part of the device head. Advantageously, the housing part protects the device head and its electronic components from moisture, dust, dirt or mechanical damage.

In an embodiment, the plug-in module further comprises a housing part in which at least the liquid treatment device interface is arranged, and which includes the means for mechanically coupling the plug-in module to the liquid treatment device.

Preferably, the means for mechanically coupling the plug-in module to the liquid treatment device are integrally formed with the housing part of the plug-in module. Advantageously, the housing part protects the device head and its electronic components from moisture, dust, dirt or mechanical damage.

Preferably, the housing part of the device head and the housing part of the plug-in part fit together in sealing manner to form a closed housing protecting the electronic parts of both the device head and the plug-in module from moisture, dust, dirt or mechanical damage.

In an embodiment, the liquid treatment device and the plug-in module further comprise means for authenticating the plug-in module to the liquid treatment device.

Within the framework of the invention, there is a difference between identification and authentication. Identifying the plug-in module means, as stated above, that the type of the plug-in module is recognized as a type of plug-in modules which is compatible with the device head. Authenticating the plug-in module means, that the plug-in module has an access right for receiving the parameter from the device head.

In an embodiment, the authentication of the plug-in module requires the identification of the plug-in module.

Preferably, the means for authenticating the plug-in module to the liquid treatment device comprise a pair of symmetric or asymmetric keys, which are assigned to the liquid treatment device and the plug-in module respectively. The authentication process may comprise exchanging a signature, which was encrypted with one of the keys and is decrypted with the other.

In an embodiment, the liquid treatment device comprises a status indicator and the plug-in module comprises means for forwarding a signal from the status indicator.

The signal from the status indicator may for example indicate the operating status of the liquid treatment device, e.g. "power on" or whether it is active or not.

In an embodiment, the status indicator is a light source, preferably a LED, and the means for forwarding the signal from the status indicator are a light guide or fiber optics cable forwarding the light from the light source to a surface of the plug-in module. For example, when the light source is positioned at or within the housing part of the device head the light guide within the housing part of the plug-in module forwards the light signal from the status indicator to a window in the surface of the housing part of the plug-in module to be visible from outside.

The light source may have two states indicating at least two states of the liquid treatment device. For example, a light source emitting light may indicate an activity of the liquid treatment device and the light source not emitting light may indicate the liquid treatment device being inactive. Alternatively, these two states may be indicated by light of different color.

In an embodiment, the liquid treatment medium is a filter medium. In this embodiment, the liquid treatment device is a filter device.

In another aspect, the invention relates to a plug-in module for the aforementioned liquid treatment device, wherein the plug-in module comprises a liquid treatment device interface for connecting to the liquid treatment device, means for identifying the plug-in module to the liquid treatment device, means for receiving a parameter characterizing the liquid treatment process from the liquid treatment device and means for functional processing of the parameter. Preferably, the liquid treatment device interface is arranged for communicatively coupling the plug-in module to a liquid treatment device and the plug-in module further comprises: means for mechanically coupling the plug-in module to the liquid treatment device.

The plug-in module may be communicatively coupled to the liquid treatment device via the liquid treatment device interface. The liquid treatment device interface of the plug-in module and the plug-in module interface of the liquid treatment device may be formed as a pair consisting of a male and a female connectors. Furthermore, the liquid treatment device interface and the plug-in module interface preferably may be both universal asynchronous receiver transmitter (UART) interfaces.

Additionally, the plug-in module may be mechanically coupled to the liquid treatment device via the means for mechanically coupling the plug-in module to the liquid treatment device. The means for mechanically coupling disburden the mechanical stress from the interfaces.

In another embodiment, the means for identifying the plug-in module to the liquid treatment device comprise means for receiving an identification request from the liquid treatment device via the liquid treatment device interface and means for sending the response to the identification request to the liquid treatment device via the liquid treatment device interface. The response may comprise an identification number of the plug-in module characterizing the type of the plug-in module. In another embodiment the response may comprise the serial number of the plug-in module identifying the plug-in module itself.

The plug-in module may preferably comprise a processing unit, which may for example be a single or multicore microprocessor, a field programmable gate array, a micro-controller or any other device capable of executing a program code.

The form of the means for functional processing depends on the function of the plug-in module.

In one embodiment, the plug-in module is a plug-in memory module, which may be exchanged to obtain data analysis whilst another plug-in memory module is provided to the liquid treatment device for continuing operation. Then, the means for functional processing of the plug-in memory module are a non-volatile memory unit and a processing unit configured to store the parameter received from the liquid treatment device to the memory of the plug-in memory unit module.

In another embodiment, the plug-in module is a plug-in display module for displaying the parameter to a user. The means for functional processing of the parameter of the plug-in module are in the form of a display and a processing unit, which is configured to display the parameter on the display of the plug-in module. In yet another embodiment, the liquid treatment device may receive input from the plug-in display module, wherein the plug-in display module comprises a touch display or a display in combination with an input device, for example a keyboard, one or more buttons, a microphone or any combination thereof. In these embodiments, the plug-in display module is a human-machine interface.

In an embodiment, the plug-in module is a plug-in communication module connectable to at least one external system and the means for functional processing are means for communicating with the external system and sending at least the parameter from the plug-in module to the external system via wired or wireless communication.

The plug-in module being a plug-in communication module for wired communication comprises a plug for plugging in a cable or a fiber optic cable. Alternatively, it might comprise a cable or a fiber optic cable for plugging into the external system.

The plug-in module being a plug-in communication module for wireless communication comprises a wireless communication interface, i. e. an antenna, an infrared sensor and an infrared light source, or an ultrasound sensor and an ultrasound speaker.

In an embodiment, the plug-in module is supplied with power via the coupling to the liquid treatment device over the plug-in module interface and the liquid treatment interface. In another embodiment, the plug-in module is supplied with power over a separate connection for power supply. In yet another embodiment, the plug-in module may contain an on-board power source such as a rechargeable or an exchangeable battery.

In another aspect, the invention relates to a method for operating a system as described above, wherein the method comprises:

determining a parameter characterizing the liquid treatment process by the means for determining the parameter of the liquid treatment device and sending the parameter to the processing unit of the liquid treatment device;

receiving the parameter by the processing unit of the liquid treatment device;

mechanically coupling the plug-in module to the liquid treatment device by connecting the means for mechanically coupling the liquid treatment device to the plug-in module of the liquid treatment device with the means for mechanically coupling the plug-in module to the liquid treatment device of the plug-in module and communicatively coupling the plug-in module to the liquid treatment device by connecting the plug-in module interface with the liquid treatment device interface;

detecting the plug-in module being coupled to the liquid treatment device via the plug-in module interface and the liquid treatment device interface by monitoring a signal response send from the processing unit of the liquid treatment device to the plug-in module interface;

upon detecting the plug-in module being coupled to the liquid treatment device identifying the plug-in module by the processing unit of the liquid treatment device;

in response to identifying the plug-in module loading instructions for handling the parameter from the memory unit to the processing unit of the liquid treatment device;

sending the parameter according to the instructions from the processing unit of the liquid treatment device via the plug-in module interface and the liquid treatment device interface to the plug-in module;

upon receiving the parameter from the liquid treatment device processing the parameter with the means for functional processing of the parameter of the plug-in module.

In an embodiment, the identifying the plug-in module comprises the steps of sending an identification request from the liquid treatment device via the plug-in module interface and the liquid treatment device interface to the plug-in module; and receiving a response to the identification request via the plug-in module interface and the liquid treatment device interface from the plug-in module, wherein the response to the identification request comprises information on the type of the plug-in module.

In an embodiment, a first key is assigned to the plug-in module and a second key is assigned to the liquid treatment device, wherein the method comprises the following steps prior to sending the parameter to the plug-in module:

sending an authentication request from the liquid treatment device via the plug-in module interface and the liquid treatment device interface to the plug-in module;

receiving a response to the authentication request via the plug-in module interface and the liquid treatment device interface from the plug-in module, wherein the response to the authentication request comprises a signature of the plug-in module being encrypted with the first key;

decrypting the signature from the plug-in module with the second key by the processing unit of the liquid treatment device;

verifying the decrypted signature from the plug-in module with a list of authorized signatures, wherein the list of authorized signatures is stored within the memory unit of the liquid treatment device;

wherein the parameter is sent to the plug-in module only if the verification of the decrypted signature from the plug-in module results in the plug-in module being authenticated to receive the parameter.

DETAILED DESCRIPTION OF THE INVENTION

Figure 1:
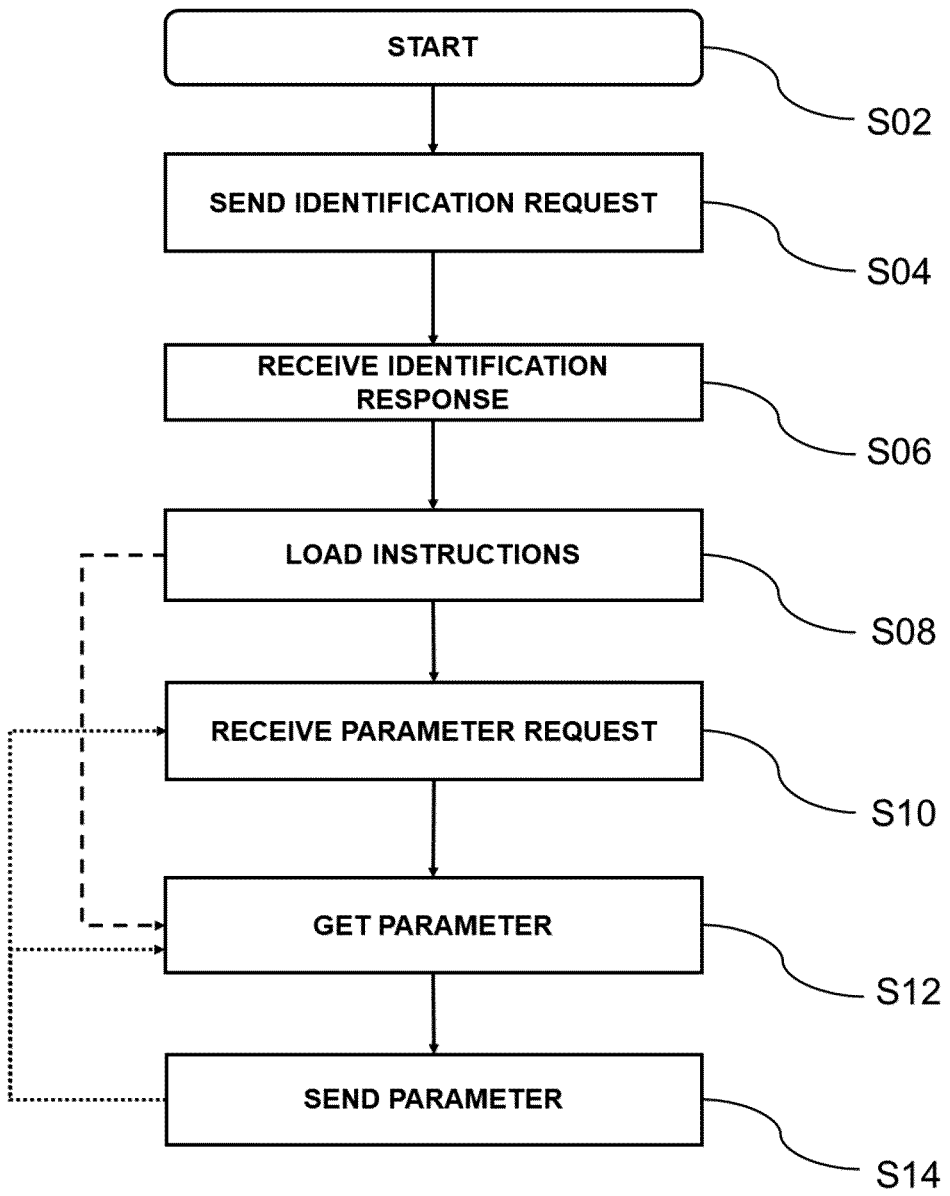
FIG. 1 a flow chart of a method according to embodiments of the present invention.

FIG. 1 shows a flow chart, which shows a method according to embodiments of the invention. The method starts at step S02, when the liquid treatment device is put into operation or when the plug-in module is coupled to the liquid treatment device. This depends on whether the plug-in module may be plugged in whilst the liquid treatment device is active or if the liquid treatment device has to be shut down for installing the plug-in module.

After the method has started at step S02 when the liquid treatment device is put into operation, the liquid treatment device may try to detect a plug-in module at the plug-in module interface. For detection, the liquid treatment device or rather a processing unit of the liquid treatment device may for example provide a testing current at the plug-in module interface.

If a plug-in module is successfully detected at the plug-in module interface, the processing unit sends an identification request to the plug-in module at step S04. The identification request may for example comprise instructions for the plug-in module to return an identification number or a number representing the type of the plug-in module, which may be saved at a memory unit of the plug-in module, r instructions for responding with an authentication process.

Upon receiving the identification request, the plug-in module responds with an identification response, which is received by the liquid treatment device at step S06. The response comprises preferably the requested values for identifying the plug-in module.

If the plug-in module is identified successfully, the processing unit of the liquid treatment device loads instructions corresponding to the identified plug-in module at step S08. The loaded instructions may comprise for example instructions to choose which parameter is to be sent, when and how the parameter is to be sent or if a request for a parameter must be received from the plug-in module or an external system via the plug-in module prior to sending the parameter.

If the plug-in module is not identified successfully, the processing unit of the liquid treatment device may retry sending identification request to the plug-in module or it may retry detecting a plug-in module at the plug-in module interface.

If the instructions include a command to wait for a parameter request, the processing unit of the liquid treatment device enters an idle mode, in which it waits for a parameter request. The liquid treatment device is now ready to send the parameter to the plug-in module, i.e. the liquid treatment device provides the sending of the parameter to the plug-in module. The parameter request may be received via the plug-in module from the external system, for example a terminal or a personal computer at step S10. Alternatively, the parameter request may be received from the plug-in module itself, for example if the plug-in module is a plug-in display module providing a human-machine interface and receiving input from a user to handle or show a specific parameter in the display of the plug-in module.

If the instructions do not include a command to wait for a parameter request, but a command for sending the parameter via the plug-in module or broadcast the parameter via the plug-in module, step S10 may be skipped, which is indicated by the dashed arrow. The method continues with step S12, getting the parameter.

To get the parameter, the processing unit of the liquid treatment device may read out a sensor of the liquid treatment device or take a setting value of one r more of the components of the liquid treatment device. A parameter read out from a sensor may be the water hardness, the conductivity, the Ca-content, the Fe-content, etc. of the liquid or it may be the setting value of a valve, a valve motor, or of another component within the liquid treatment device.

Step S12 may also be executed continuously while other steps are performed in parallel. Furthermore, step S12 may be executed alternatively before the previous steps S04-S10, since identifying the plug-in module is not necessary for getting the parameter. In some embodiments, the instructions loaded in S08 may determine the parameter to get in step S12. Then of course, step S12 is executed after step S08, as shown in FIG. 1.

When both the processing unit of the liquid treatment device has obtained the parameter and the plug-in module is identified successfully, the parameter is sent to the plug-in module in step S14. As described above, the parameter may be broadcasted, continuously streamed or send upon the parameter request of an external system. After sending the parameter the liquid treatment device either returns to idle mode and waits for another parameter request or it sends another parameter. This depends on whether the sending of the parameter requires a parameter request prior to sending the parameter or not. The options are indicated by the dotted arrows in FIG. 1.

Figure 2:
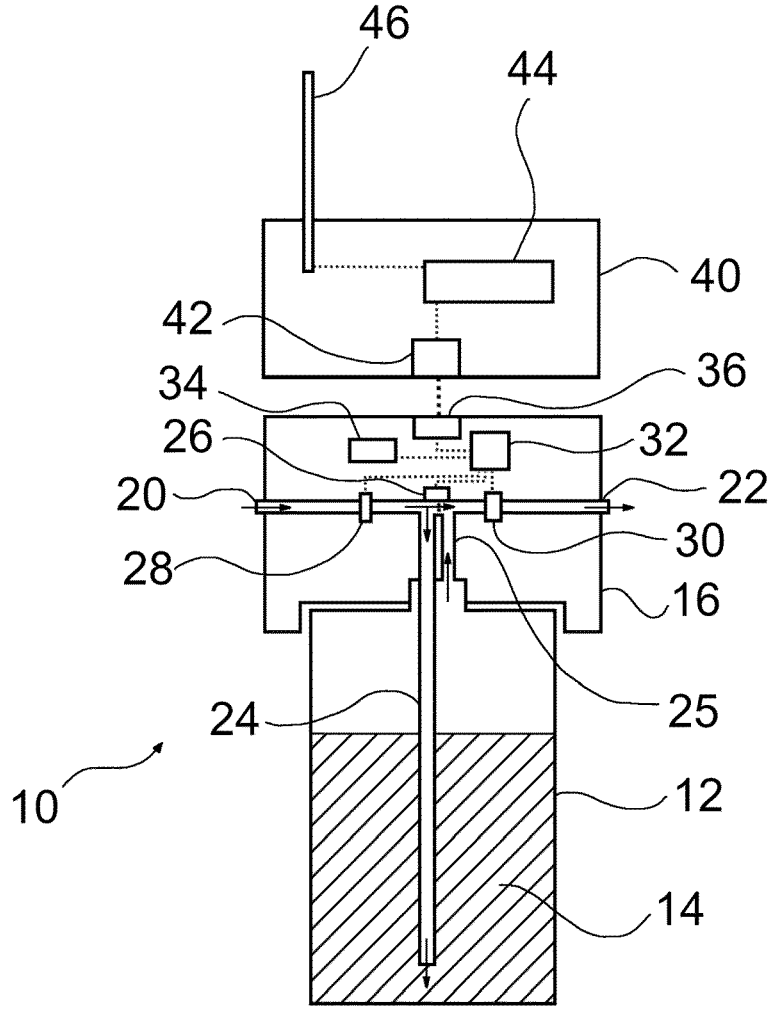
FIG. 2 a schematic view of a liquid treatment device and a plug-in module according to an embodiment of the invention.

FIG. 2 shows a schematic view of a liquid treatment device 10 and a plug-in module 40 according to an embodiment of the invention. The liquid treatment device 10 shown here comprises a liquid treatment container 12 filled with a liquid treatment medium 14. The liquid treatment device 10 further comprises a device head 16 connected to the liquid treatment container 12. Although the name "head" suggests that the device head 16 sits on top of the liquid treatment container 12, the device head 16 may also be positioned below, next to or within the liquid treatment container 12. The liquid treatment container 12 and the device head 16 may be detachably connected to each other or they may share a common housing. Using a detachably connected liquid treatment container 12 has the advantage of being able to exchange only the liquid treatment container 12, if the liquid treatment medium 14 is depleted or exhausted, wherein the device head 16 may stay connected to its application point. In this case, the liquid treatment container 12 may be formed as a cartridge, which is connected to the device head 16.

The device head 16 comprises an inlet 20 and an outlet 22. Within the liquid treatment device 10, the liquid flows from inlet 20 through line 24. The inlet 20, being on end of the line 24, is connected to a liquid supply, for example a water supply pipe. The flow direction of the liquid within the line 24 is indicated by arrows.

The liquid flows through line 24 into the liquid treatment medium 14, where it is treated. For example, the liquid treatment medium 14 is a reactor medium, which reacts with the liquid, or it is a filter medium for filtering the liquid. After being treated, the liquid leaves the liquid treatment container 12 into line 25, which is connected to the outlet 22. The liquid may then flow out of the liquid treatment device 10 through the outlet 22, which may for example be connected to a tap or another pipe.

In the shown embodiment, the line 24 has a shortcut to line 25. The shortcut may be opened or closed by a mixing valve (not shown), which is controlled by a valve motor 26. In alternative embodiments, the shortcut may be controlled by an aperture or other electromechanical components. The mixing valve controls the portions of the liquid flowing through the shortcut and flowing through the liquid treatment medium 14. For that, the valve motor 26 is controlled by using a signal comprising a motor control value to set the mixing valve open, partially open or closed. The motor control value may be a parameter, which is to be sent to the plug-in module 40 as described later on.

The device head 16 of FIG. 2 further comprises a set of sensors 28 and 30 to measure a parameter of the liquid. The parameter determined by the sensor 28 may for example be the water hardness, the conductivity, Ca-content, Fe-content, etc. before the treatment and the parameter determined by the sensor 30 may for example be the water hardness, the conductivity, Ca-content, Fe-content, etc. after the treatment. By measuring the parameter before, its treatment and after the treatment allows to determine the treatment efficiency. Measuring the parameter after the treatment may in many cases be sufficient as the treated liquid characteristics or the treated liquid quality provided for example for further processes or for consumption is the more important value, which preferably should be kept at a constant level. In an industrial application, the parameter may be used for a next production step, in which the liquid is used. The parameter determined by the liquid treatment device 10 may be used as an input value for another apparatus or system or as a control variable, for example, for setting the valve position.

The device head 16 shown in FIG. 2 further comprises a processing unit 32 and a memory unit 34 for controlling the operation of the liquid treatment device 10 and for handling the parameter. The liquid treatment device 10 may be controlled by an operating system, which is stored on the memory unit 34 and run on the processing unit 32.

The device head 16 further comprises a plug-in module interface 36 for coupling the liquid treatment device 10 to a plug-in module 40. The plug-in module 40 on the other side comprises a liquid treatment device interface 42 for coupling the plug-in module 40 to the liquid treatment device 10. Both the liquid treatment device interface 42 and the plug-in module interface 36 are interfaces for plug and play appliances, i. e. the plug-in module 40 may just be plugged into the plug-in module interface 36 to provide its function to the liquid treatment device 10.

To prevent an undesired detachment of the plug-in module 40 from the liquid treatment device 10, both may comprise means for fixing or mechanically coupling the plug-in module to the liquid treatment device (not shown here). The means for fixing may be for example screws, bolts, latching connections, bayonet connections or other clamping devices.

The plug-in module 40 shown in FIG. 2 comprises its own processing unit 44 for processing the operating system of the plug-in module 40, or for handling incoming requests for identification or requests for parameters or other tasks executed by the plug-in module 40.

Figure 3:
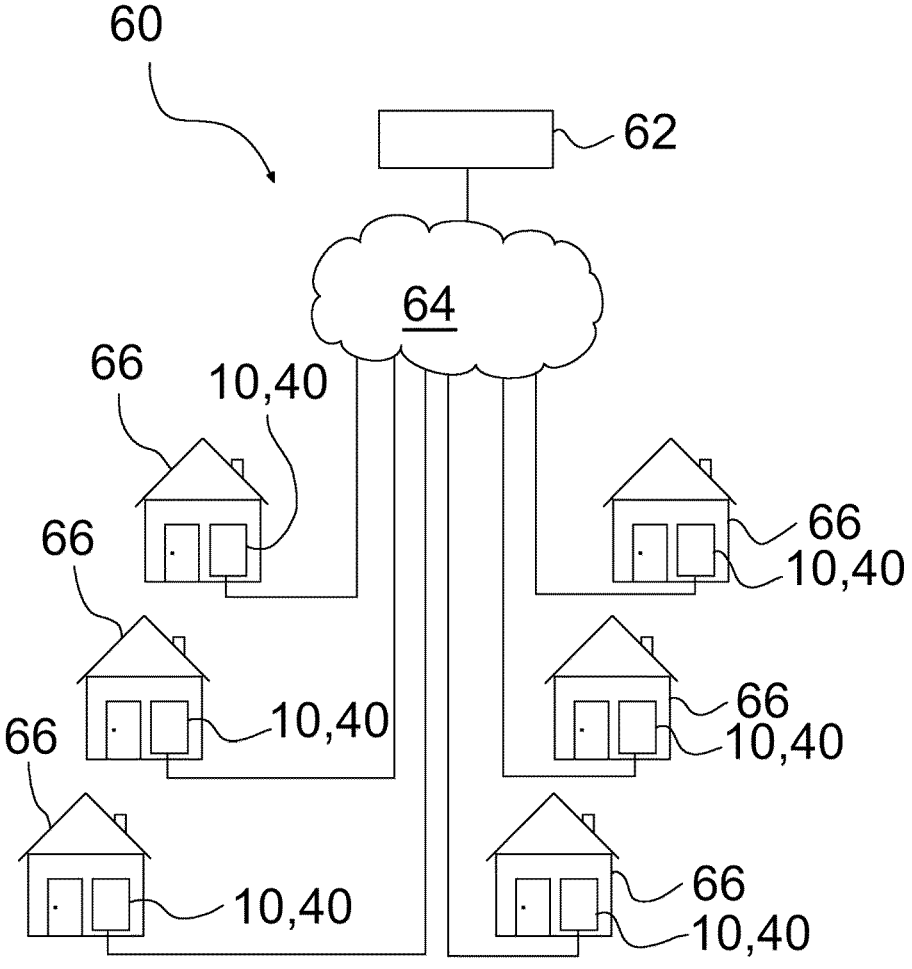
FIG. 3 a schematic view of a system according to an embodiment of the invention.

Furthermore, the plug-in module 40 shown in FIG. 2 is a connection module for connecting the liquid treatment device 10 to an external system (not shown here, see FIG. 3). For that, the plug-in module 40 further comprises a transmitting and receiving unit, representative of which an antenna 46 is illustrated, which is able to send and receive data wirelessly. The plug-in module 40 may connect the liquid treatment device 10 with a network or a router (both not shown) by providing the function of communication. For example, the liquid treatment device 10 may send the parameter measured by the sensors 28 and 30 and handled by the processing unit 32 of the device head 16 via the plug-in module interface 36 and the liquid treatment device interface 42 to the plug-in module 40, which forwards the parameter to the external system wirelessly by using the processing unit 44 of the plug-in module 40 and the antenna 46.

In alternate embodiments and depending on the function of the plug-in module 40 the antenna 46 may be replaced or accompanied by a memory unit, a display module, an input interface like a keyboard or buttons or any combination thereof or a special interface for user-specific solutions.

FIG. 3 shows a schematic view of a system 60 according to an embodiment of the invention. The system comprises a terminal, which is a server 62. The server 62 is connected to a network 64. The network 64 may be the Internet in this embodiment. In other embodiments, it may be an intranet or a (wireless) local area network.

A plurality of homes, stores, offices or other buildings provide an access point 66 each. Each of the buildings is also provided with a liquid treatment device 10 and a plug-in module 40, the latter being a plug-in communication module. Each liquid treatment device 10 and plug-in module 40 are registered at the server 62.

The parameter determined by the liquid treatment device 10 may for example be a parameter characterizing the efficiency of the treatment process. The server 62 may further be configured to send parameter requests to the liquid treatment devices 10 via the network 64 and the plug-in modules 40. It may be further configured to receive the parameter from the liquid treatment devices 10 via the plug-in modules 40 and the network 64 of each access point 66. The communication between the liquid treatment devices 10 and the server 62 may preferably be encrypted.

For encrypting the communication, preferably an asymmetric encryption method is used. Therefore, the server may have a public and a private key, wherein each of the liquid treatment devices 10 or its plug-in module 40 also have a public and a private key each. Each pair of public and private keys is configured to encrypt data with the public key and to decrypt the encrypted data only with the corresponding private key of the same pair. To use the asymmetric encryption, the public keys of the server 62 and the liquid treatment devices 10 are exchanged. When sending data to each other each sending entity uses the public key of the receiving entity to encrypt the data. The receiving entity on the other side decrypts the data by using its private key. Thus, only the destined receiving entity holding its own private key may decrypt the data.

The server 62 may be further configured to surveil the correct operation of the liquid treatment devices 10 at each access point 66. If one of the parameters received from one of the liquid treatment devices 10 diverges from the others, the server 62 may send a notification, which informs a technician about a malfunction of said liquid treatment device 10. By this, a provider of the server 62 and the liquid treatment devices 10 may ensure a quick response maintenance.

Figure 4:
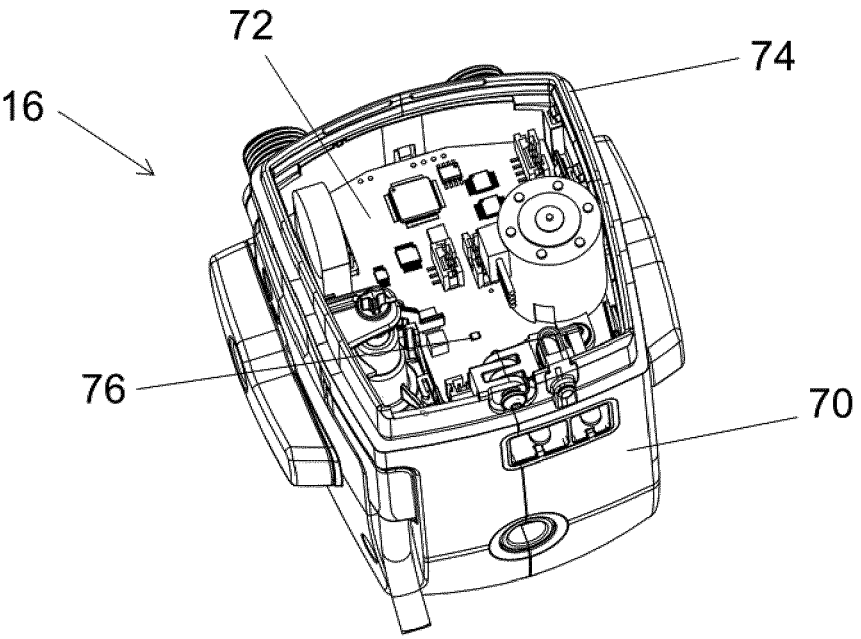
FIG. 4 a perspective view of a device head without plug-in module coupled to it.

FIG. 4 shows an embodiment of the device head 16 in a perspective view from above. The device head 16 comprises a housing part 70 with an opening at the top to allow a view of the electronic components inside. Particularly a main printed circuit board 72 can be seen on which at least some of the electronic components of the device head 16, particularly the processing unit and the plug in module interface, are arranged. The means for mechanically coupling the liquid treatment device to the plug-in module are included in the housing part 70 of the device head 16 in the form of a circumferential rim 74 surrounding the opening. In this embodiment, a light source, particularly a LED 76, is placed on the main printed circuit board 72 as a status indicator, for example, indicate the one or more operating conditions of the liquid treatment device.

Figure 5:
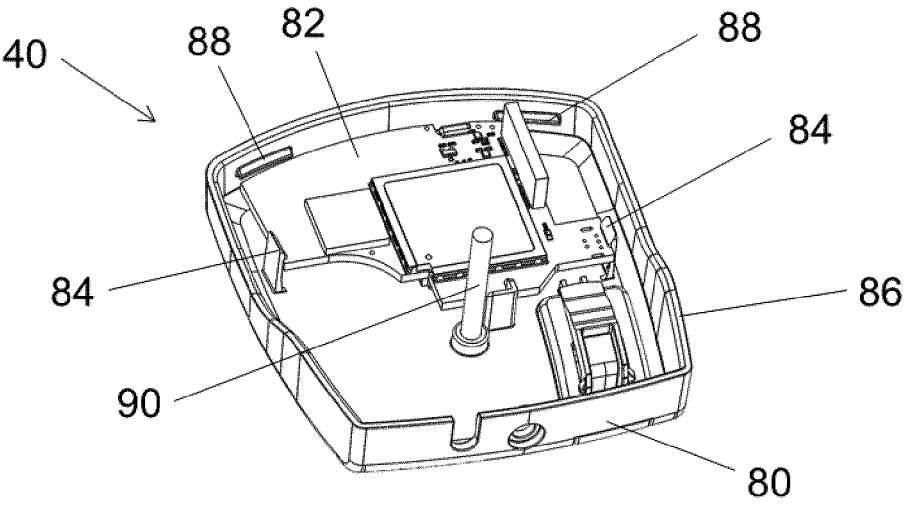
FIG. 5 a perspective view of a plug-in module.

FIG. 5 shows an embodiment of the plug-in module 40 in a perspective view from below. The plug in module comprises a housing part 80 which is open at the bottom to allow a view of the electronic components inside. Particularly a printed circuit board 82 can be seen being releasably attached to the housing part 80 by a number of clips 84. On the plug-in module printed circuit board 82 the electronic components of the plug-in module 40, namely the liquid treatment device interface, the means for identifying the plug-in module 40 to the liquid treatment device, the means for receiving a parameter characterizing the liquid treatment process from the liquid treatment device and the means for functional processing of the parameter, are arranged. By being releasably attached to the housing part 80 the printed circuit board 82 according to this preferred embodiment is configured to be easily exchangeable by another printed circuit board providing different functionality. The means for mechanically coupling the plug-in module 40 to the liquid treatment device are included in the housing part 80 of the plug-in module 40 in the form of a circumferential wall 86 of the housing part 80 and a number of latches 88 on the inside thereof. The plug-in module further comprises a light guide 90 for forwarding the light from the LED 76 to a window 92 in the surface of the housing part 80 of the plug-in module 40, see FIG. 6.

Figure 6:
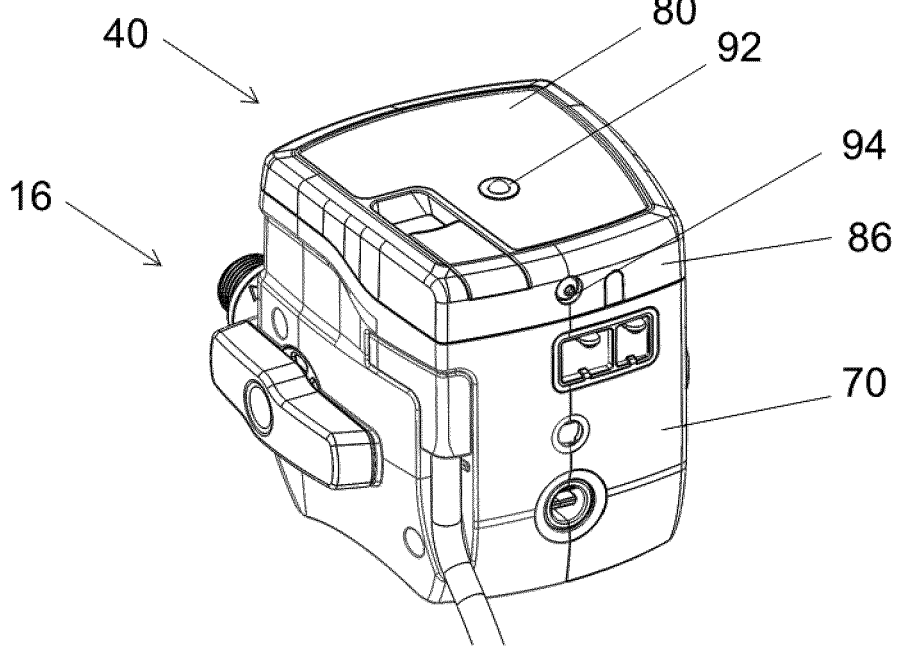
FIG. 6 a perspective view of a device head with a plug-in module coupled to it.

The housing part 70 of the device head 16 is arranged to be closed by the housing part 80 of the plug in module 40 as shown in FIG. 6. In assembled condition the plug-in module interface and the liquid treatment device interface are communicatively coupling the plug-in module and the liquid treatment device as described above. Also, the LED 76 and the light guide 90 are positioned side by side to allow the light emitted by LED 76 to enter the light guide and to transport it to the window 92. The circumferential wall 86 of the plug-in module housing part 80 envelopes the rim 74 of the device head housing part 70 thereby closing the device head in sealing manner to form a closed housing protecting the electronic parts of both the device head and the plug-in module from moisture, dust, dirt or mechanical damage. Thus, the plug-in module housing part 80 forms a lid for the device head housing part 70. Further, in the closed state the latches 88 are in engagement with corresponding recesses or holes (not shown) in the rim 74 thereby securing the plug-in module 40 against accidentally falling off of the device head 16. Thereby, the latches 88 and the corresponding holes or recesses are means for mechanically coupling the plug-in module 40 to the liquid treatment device being formed as a pair of releasable interlocking means. In addition a screw 94 fixes the plug-in module housing part 80 to the device head housing part 70.

LIST OF REFERENCES

S02 START
S04 SEND IDENTIFICATION REQUEST
S06 RECEIVE IDENTIFICATION RESPONSE
S08 LOAD INSTRUCTIONS
S10 RECEIVE PARAMETER REQUEST
S12 GET PARAMETER
S14 SEND PARAMETER
10 liquid treatment device
12 liquid treatment container
14 liquid treatment medium
16 device head
20 inlet
22 outlet
24 line
25 line
26 valve motor
28 sensor
30 sensor
32 processing unit
34 memory unit
36 plug-in module interface
40 plug-in module
42 liquid treatment device interface
44 processing unit
46 antenna
60 system
62 server
64 network
66 access point
70 housing part of the device head
72 main printed circuit board of the device head
74 circumferential rim
76 LED
80 housing part of the plug in module
82 printed circuit board of the plug in module
84 clip
86 circumferential wall
88 latch
90 light guide
92 window
94 screw

What is claimed is:

1. A liquid treatment device, comprising:
a liquid treatment container containing at least one liquid treatment medium, an inlet for receiving liquid, and an outlet for the liquid; and
a device head adapted for detachable coupling to the liquid treatment container, wherein the device head has an inlet line detachably coupled to the inlet and an outlet line detachably coupled to the outlet of the liquid treatment container, the device head comprising:
a processing unit;
a memory unit communicatively connected to the processing unit;
a sensor comprising i) integrated circuits within the processing unit or ii) software, which is stored on the memory unit and executed by the processing unit for determining a parameter characterizing a liquid treatment process;
a plug-in module interface for plug-in modules coupled to the processing unit, configured to enable a communication with different types of plug-in modules, wherein the types of plug-in modules are distinguished by using different communication standards or by having different functionalities; and
means for mechanically coupling the liquid treatment device to the plug-in module,
a housing part in which at least the plug-in module interface is arranged, which housing part includes the means for mechanically coupling the liquid treatment device to the plug-in module and is configured to fit to a housing part of the plug-in module in a sealing manner to form a closed housing protecting electronic parts of both the device head and the plug-in module from moisture, dust, dirt or mechanical damage,
integrated circuits within the processing unit or in the form of software, which is stored on the memory unit and executed by the processing unit for identifying the plug-in module;
integrated circuits within the processing unit or in the form of software, which is stored on the memory unit and executed by the processing unit for loading instructions from the memory unit in response to identifying the plug-in module;
wherein the instructions are loaded in response to identifying the plug-in module,
wherein the loaded instructions depend on the type of the coupled plug-in module; and
integrated circuits within the processing unit or in the form of software, which is stored on the memory unit and executed by the processing unit for sending the parameter according to the instructions via the plug-in module interface to the plug-in module.

2. A method for operating the liquid treatment device according to claim 1, wherein the method comprises the steps of:
determining the parameter characterizing the liquid treatment process and sending the parameter to the processing unit;
receiving the parameter by the processing unit;
identifying a plug-in module coupled to the plug-in module interface by the processing unit;
in response to identifying the plug-in module, loading instructions from the memory unit to the processing unit; and
sending the parameter according to the instructions via the plug-in module interface to the plug-in module by the processing unit.

3. The method according to claim 2, wherein identifying the plug-in module comprises the steps of:
i. sending an identification request to the plug-in module via the plug-in module interface; and
ii. receiving a response to the identification request from the plug-in module.

4. The method according to claim 2, wherein the plug-in module is a plug-in communication module and the method further comprises
sending the parameter from the plug-in module to an external system via wired or wireless communication.

5. The method according to claim 2, wherein the liquid treatment device further comprises the liquid treatment container and a sensor, wherein the sensor is communicatively connected to the processing unit, and wherein the parameter characterizing the liquid treatment process is a parameter characterizing a liquid passing the liquid treatment container.

6. The liquid treatment device according to claim 1, wherein the integrated circuits within the processing unit or in the form of software, which is stored on the memory unit and executed by the processing unit for identifying the plug-in module are configured to perform the steps of:

sending an identification request to the plug-in module via the plug-in module interface; and receiving a response to the identification request from the plug-in module via the plug-in module interface.

7. The plug-in module for the liquid treatment device according to claim 1, wherein the plug-in module comprises:

a liquid treatment device interface for connecting to the liquid treatment device;

plug-in module integrated circuits within a plug-in module processing unit or in the form of software, which is stored on a plug-in module memory unit and executed by the plug-in module processing unit for identifying the plug-in module to the liquid treatment device;

the plug-in module integrated circuits within the plug-in module processing unit or in the form of software, which is stored on the plug-in module memory unit and executed by the plug-in module processing unit for receiving the parameter characterizing the liquid treatment process from the liquid treatment device; and the plug-in module integrated circuits within the plug-in module processing unit or in the form of software, which is stored on the plug-in module memory unit and executed by the plug-in module processing unit for functional processing of the parameter, wherein the plug-in module further comprises the housing part in which at least the liquid treatment device interface is arranged, which housing part includes means for mechanically coupling the plug-in module to the liquid treatment device and is configured to fit to the housing part of the device head in a sealing manner to form the closed housing protecting electronic parts of both the device head and the plug-in module from moisture, dust, dirt or mechanical damage.

8. The plug-in module according to claim 7, wherein the plug-in module is a plug-in communication module connectable to at least one external system and the plug-in module integrated circuits within the plug-in module processing unit or in the form of software, which is stored on the plug-in module memory unit and executed by the plug-in module processing unit for functional processing are for communicating with the external system and sending at least the parameter from the plug-in module to the external system via wired or wireless communication.

9. A system for liquid treatment, the system comprising:

the liquid treatment device according to claim 1; and the plug-in module comprising:

a liquid treatment device interface for connecting to the liquid treatment device;

plug-in module integrated circuits within a plug-in module processing unit or in the form of software, which is stored on a plug-in module memory unit and executed by the plug-in module processing unit for identifying the plug-in module to the liquid treatment device;

the plug-in module integrated circuits within the plug-in module processing unit or in the form of software, which is stored on the plug-in module memory unit and executed by the plug-in module processing unit for receiving a parameter characterizing the liquid treatment process from the liquid treatment device; and the plug-in module integrated circuits within the plug-in module processing unit or in the form of software, which is stored on the plug-in module memory unit and executed by the plug-in module processing unit for functional processing of the parameter, wherein the plug-in module further comprises a housing part in which at least the liquid treatment device interface is arranged, which housing part includes means for mechanically coupling the plug-in module to the liquid treatment device and is configured to fit to the housing part of the device head in a sealing manner to form the closed housing protecting electronic parts of both the device head and the plug-in module from moisture, dust, dirt or mechanical damage.

10. The system according to claim 9, wherein the system further comprises:

a terminal wherein the terminal comprises:

a terminal processing unit;

a terminal memory unit;

terminal integrated circuits within the terminal processing unit or in the form of software, which is stored on a terminal memory unit and executed by the terminal processing unit for communicating with the plug-in module; and the terminal integrated circuits within the terminal processing unit or in the form of software, which is stored on the terminal memory unit and executed by the terminal processing unit for receiving the parameter from the plug-in module, wherein the plug-in module further comprises:

the plug-in module integrated circuits within the plug-in module processing unit or in the form of software, which is stored on the plug-in module memory unit and executed by the plug-in module processing unit for executing instructions received from the terminal.

11. The system according to claim 10, wherein the plug-in module integrated circuits within the plug-in module processing unit or in the form of software, which is stored on the plug-in module memory unit and executed by the plug-in module processing unit for functional processing of the parameter are for communicating with the terminal.

12. The system according to claim 9, wherein the plug-in module integrated circuits within the plug-in module processing unit or in the form of software, which is stored on the plug-in module memory unit and executed by the plug-in module processing unit for functional processing of the parameter comprise a display for displaying the parameter, a mass memory module comprising a memory for storing the parameter or a combination thereof.

13. The system according to claim 9, wherein the device head integrated circuits within the device head processing unit or in the form of software, which is stored on the device head memory unit and executed by the device head processing unit for authenticating the plug-in module to the liquid treatment device.

14. The system according to claim 9, wherein the liquid treatment device comprises a status indicator and the plug-in module comprises means for forwarding a signal from the status indicator.

15. The system according to claim 14, wherein the status indicator is a light source and the means for forwarding the signal from the status indicator is a light guide or fiber optics cable forwarding the light from the light source to a surface of the plug-in module.

16. The system according to claim 9, wherein the liquid treatment medium is a filter medium.

17. A method for operating the system according to claim 9, wherein the method comprises:

determining a parameter characterizing the liquid treatment process by a means for determining the parameter of the liquid treatment device and sending the parameter to the processing unit of the liquid treatment device;

receiving the parameter by the processing unit of the liquid treatment device;

mechanically coupling the plug-in module to the liquid treatment device by connecting the means for mechanically coupling the liquid treatment device to the plug-in module of the liquid treatment device with the means for mechanically coupling the plug-in module to the liquid treatment device of the plug-in module, and communicatively coupling the plug-in module to the liquid treatment device by connecting the plug-in module interface with the liquid treatment device interface;

detecting the plug-in module being coupled to the liquid treatment device via the plug-in module interface and the liquid treatment device interface by monitoring a signal response sent from the processing unit of the liquid treatment device to the plug-in module interface;

upon detecting the plug-in module being coupled to the liquid treatment device identifying the plug-in module by the processing unit of the liquid treatment device;

in response to identifying the plug-in module, loading instructions for handling the parameter from the memory unit to the processing unit of the liquid treatment device;

sending the parameter according to the instructions from the processing unit of the liquid treatment device via the plug-in module interface and the liquid treatment device interface to the plug-in module;

upon receiving the parameter from the liquid treatment device, processing the parameter therewith.

18. The method according to claim 17, wherein identifying the plug-in module comprises the steps of sending an identification request from the liquid treatment device via the plug-in module interface and the liquid treatment device interface to the plug-in module; and receiving a response to the identification request via the plug-in module interface and the liquid treatment device interface from the plug-in module, wherein the response to the identification request comprises information on the type of the plug-in module.

19. The method according to claim 17, wherein a first key is assigned to the plug-in module and a second key is assigned to the liquid treatment device, wherein the method comprises the following steps prior to sending the parameter to the plug-in module:

sending an authentication request from the liquid treatment device via the plug-in module interface and the liquid treatment device interface to the plug-in module;

receiving a response to the authentication request via the plug-in module interface and the liquid treatment device interface from the plug-in module, wherein the response to the authentication request comprises a signature of the plug-in module being encrypted with the first key;

decrypting the signature from the plug-in module with the second key by the processing unit of the liquid treatment device;

verifying the decrypted signature from the plug-in module with a list of authorized signatures, wherein the list of authorized signatures is stored within the memory unit of the liquid treatment device;

wherein the parameter is sent to the plug-in module only if the verification of the decrypted signature from the plug-in module results in the plug-in module being authenticated to receive the parameter.

20. A system for liquid treatment, the system comprising a liquid treatment device and a plug-in module, wherein the liquid treatment device comprises a liquid treatment container containing at least one liquid treatment medium, an inlet for receiving liquid, and an outlet for the liquid and a device head adapted for detachable coupling to the liquid treatment container, wherein the device head has an inlet line detachably coupled to the inlet and an outlet line detachably coupled to the outlet of the liquid treatment container, and wherein the plug-in module is configured to be plugged into the device head of the liquid treatment device, the device head comprising:

a processing unit;

a memory unit communicatively connected to the processing unit;

a sensor comprising: i) integrated circuits within the processing unit or ii) software, which is stored on the memory unit and executed by the processing unit for determining a parameter characterizing a liquid treatment process;

a plug-in module interface for communicatively coupling the plug-in module to the processing unit;

integrated circuits within the processing unit or in the form of software, which is stored on the memory unit and executed by the processing unit for identifying the plug-in module;

integrated circuits within the processing unit or in the form of software, which is stored on the memory unit and executed by the processing unit for loading instructions from the memory unit in response to identifying the plug-in module;

integrated circuits within the processing unit or in the form of software, which is stored on the memory unit and executed by the processing unit for sending the parameter according to the instructions via the plug-in module interface to the plug-in module;

means for mechanically coupling the liquid treatment device to the plug-in module;

wherein the plug-in module comprises:

a liquid treatment device interface for communicatively coupling the plug-in module to the liquid treatment device;

plug-in module integrated circuits within a plug-in module processing unit or in the form of software, which is stored on a plug-in module memory unit and executed by the plug-in module processing unit for identifying the plug-in module to the liquid treatment device;

the plug-in module integrated circuits within the plug-in module processing unit or in the form of software, which is stored on the plug-in module memory unit and executed by the plug-in module processing unit for receiving a parameter characterizing the liquid treatment process from the liquid treatment device;

the plug-in module integrated circuits within the plug-in module processing unit or in the form of software, which is stored on a plug-in module memory unit and executed by the plug-in module processing unit for functional processing of the parameter; and means for mechanically coupling the plug-in module to the liquid treatment device.

21. The system according to claim 20, wherein the device head integrated circuits within the device head processing unit or in the form of software, which is stored on the device head memory unit and executed by the device head processing unit for identifying the plug-in module comprise:

the device head integrated circuits within the device head processing unit or in the form of software, which is stored on the device head memory unit and executed by the device head processing unit for sending an identification request to the plug-in module via the plug-in module interface; and the device head integrated circuits within the device head processing unit or in the form of software, which is stored on the device head memory unit and executed by the device head processing unit for receiving a response to the identification request from the plug-in module via the plug-in module interface.

22. The system according to claim 20, wherein the plug-in module is a plug-in communication module connectable to at least one external system and the plug-in module integrated circuits within the plug-in module processing unit or in the form of software, which is stored on the plug-in module memory unit and executed by the plug-in module processing unit for functional processing are for communicating with the external system, wherein the communication with the external system comprises at least sending the parameter from the plug-in module to the external system via wired or wireless communication.

23. The system according to claim 20, wherein the means for mechanically coupling the plug-in module to the liquid treatment device and the means for mechanically coupling the liquid treatment device to the plug-in module are formed as a pair of releasable interlocking means.

24. The system according to claim 20, wherein the means for mechanically coupling the plug-in module to the liquid treatment device and/or the means for mechanically coupling the liquid treatment device to the plug-in module are configured to be brought into a holding state for locking the coupling of the plug-in module and the liquid treatment device and a release state for removing the plug-in module from the liquid treatment device.

25. The system according to claim 20, wherein the device head further comprises a housing part in which at least the plug-in module interface is arranged, and which includes the means for mechanically coupling the liquid treatment device to the plug-in module.

26. The system according to claim 20, wherein the plug-in module further comprises a housing part in which at least the liquid treatment device interface is arranged, and which includes the means for mechanically coupling the plug-in module to the liquid treatment device.

\* \* \* \* \*